Jan. 12, 1954  P. F. EVERITT ET AL  2,665,484
SEXTANT AND OTHER ANGLE MEASURING INSTRUMENTS
Filed Oct. 4, 1949  4 Sheets-Sheet 2

INVENTORS
PHILIP FRANCIS EVERITT
JOHN KEEBLE
BY
Young, Emery & Thompson
ATTORNEYS Jan. 12, 1954  P. F. EVERITT ET AL  2,665,484
SEXTANT AND OTHER ANGLE MEASURING INSTRUMENTS
Filed Oct. 4, 1949  4 Sheets-Sheet 3

INVENTORS
PHILIP FRANCIS EVERITT
JOHN KEEBLE

BY
*Young, Emeny & Thompson*
ATTORNEYS

Patented Jan. 12, 1954

2,665,484

UNITED STATES PATENT OFFICE 2,665,484

SEXTANT AND OTHER ANGLE MEASURING INSTRUMENTS

Philip Francis Everitt, Seven Kings, and John Keeble, Ilford, England, assignors, by mesne assignments, to Kelvin & Hughes Limited, Glasgow, Scotland, a British company Application October 4, 1949, Serial No. 119,492

Claims priority, application Great Britain October 5, 1948

4 Claims. (Cl. 33—70)

This invention relates to sextants and other angle measuring instruments such as theodolites, crystal goniometers and spectrometers, and especially but not solely to periscopic sextants for use in pressurised aircraft.

According to the invention the instrument casing contains electric switches, gear change devices, and/or other parts which are controlled from outside the casing by means of a control lever that is connected to a rocking shaft that passes through the casing, the lever being movable by the operator in one direction and spring returned so that the shaft rocks to and fro through a small angle; means are provided for utilizing a succession of such operative movements of the shaft to effect a series of operations within the casing including a movement which effects driving of a driven part by a electric motor and a movement which effects stopping of said driven part when required, means for automatically stopping said driven part between said starting and stopping movements of the control lever if the driven part reaches the end of a predetermined extent of travel, whereafter the stopping movement of the lever can nevertheless be effected without restarting the driven part, and the succession of movements can then be repeated.

A constructional form of the invention will now be described by way of example with reference to the accompanying diagrammatic drawings wherein.

Figure 1:
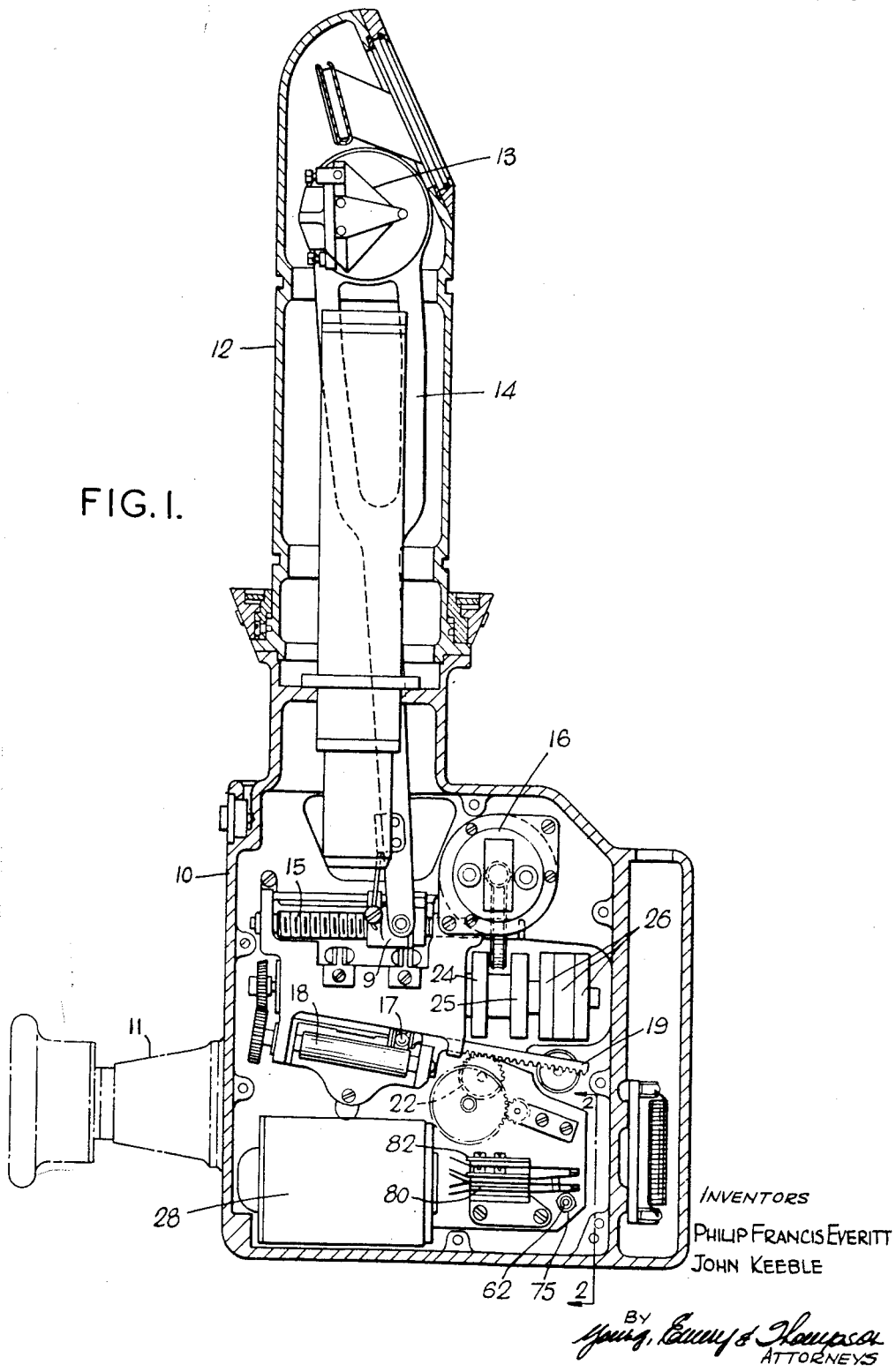
Figure 1 is a vertical sectional view of a periscopic sextant made in accordance with the invention.

The sextant comprising a box-like casing 10, having a telescopic eyepiece 11, a periscopic tube 12, a sighting prism to vary the angle of sight in accordance with the altitude of a celestial body 13, an arm 14 for adjusting the prism, a screw 15 for driving a nut 9 which in turn actuates the arm 14, a motor 16, reversible by manually operable switch means, not shown, for driving the screw, integrating means by means of which an average value of the sight angle over a continuous period of adjustment may be obtained including balls 17 driven along a cylinder 18 by a rack 19 and pinion 22, integrating drums 26 which are reset to their initial indication after said continuous period as part of the mechanical average computing procedure, and degree and minute indicating drums 24, 25. The integrating mechanism is more fully described in copending United States Patent No. 2,652,976.

Figure 3:
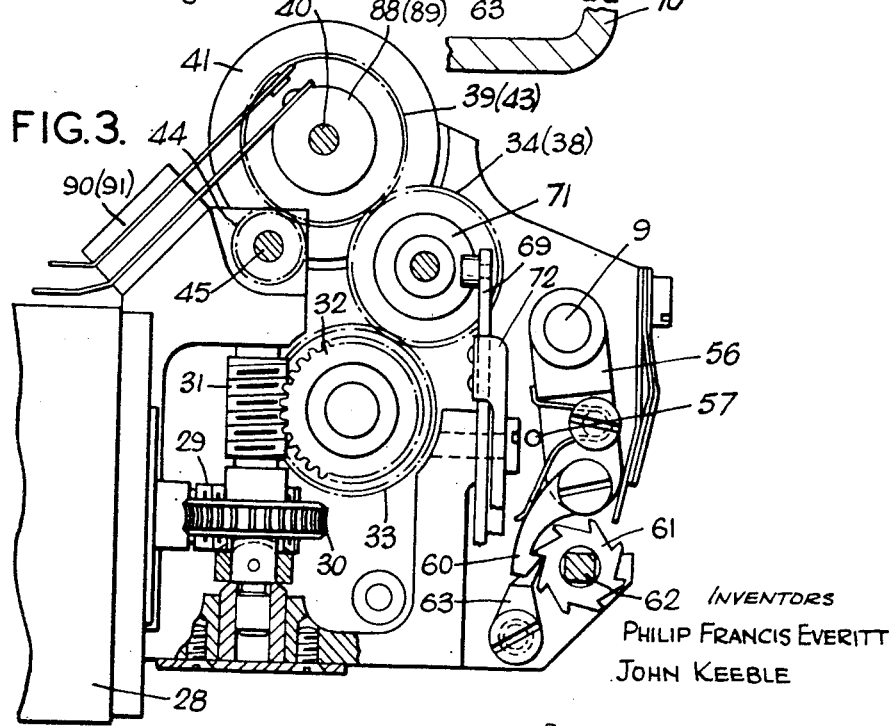
Figure 3 is a view of part of the gear shift clutch lever 69 and parts lying to the right thereof in Figure 2 in the direction of the arrow A on Figure 2.
Figure 4:
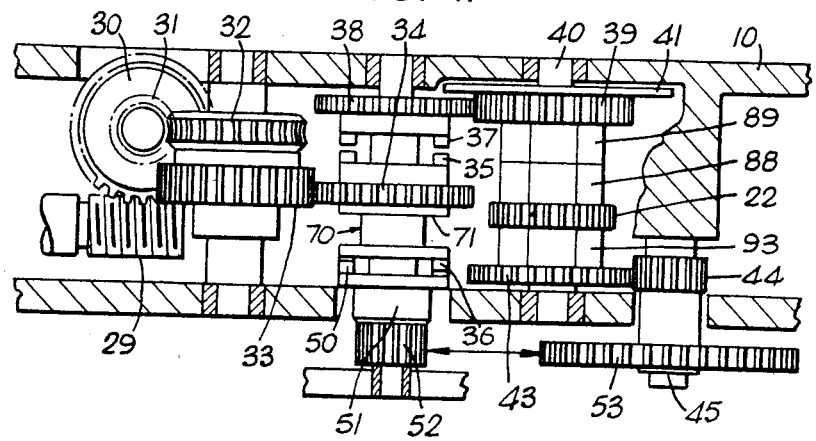
Figure 4 is a developed or "exploded" view of the reduction gearing, parts of which are shown in Figures 2 and 3.
Figure 5:
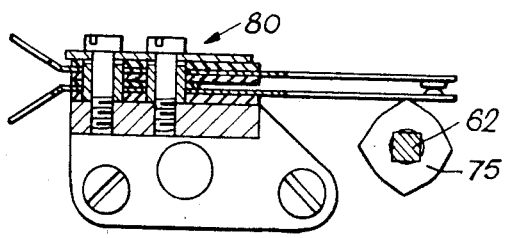
Figure 5 is a sectional view on the line 5—5 on Figure 2.
Figure 6:
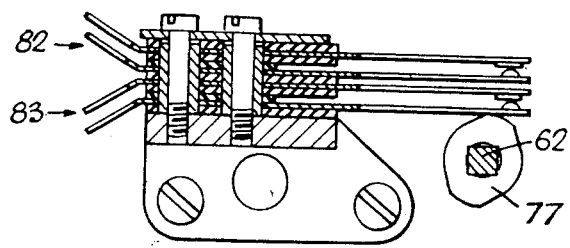
Figure 6 is a sectional view on the line 6—6 on Figure 2.

The pinion 22 is driven in one direction at one speed during measurement of altitude, and is driven in the opposite direction at a greater speed for returning the parts to their initial positions. For this purpose the gearing shown more particularly in Figure 4 is provided in which a D. C. electrically governed permanent magnetic field constant-speed motor 28 (Figure 3) drives a spindle carrying a worm 29 driving a worm-wheel 30 which in turn rotates a worm 31 in mesh with worm-wheel 32. The latter rotates a gear-wheel 33 in mesh with a sliding gear-wheel 34 which carries clutch teeth 35 on one side and clutch teeth 36 on the other side. Teeth 35 can engage teeth 37 on the side of a gear-wheel 38 which meshes with a toothed wheel 39 on a spindle 40 which carries the pinion 22. The wheel 39 drives a dial 41 which indicates half the time of total measurement. The spindle also carries a wheel 43 that gears with a pinion 44 on a spindle 45 which carries the pinion 53.

Figure 2:
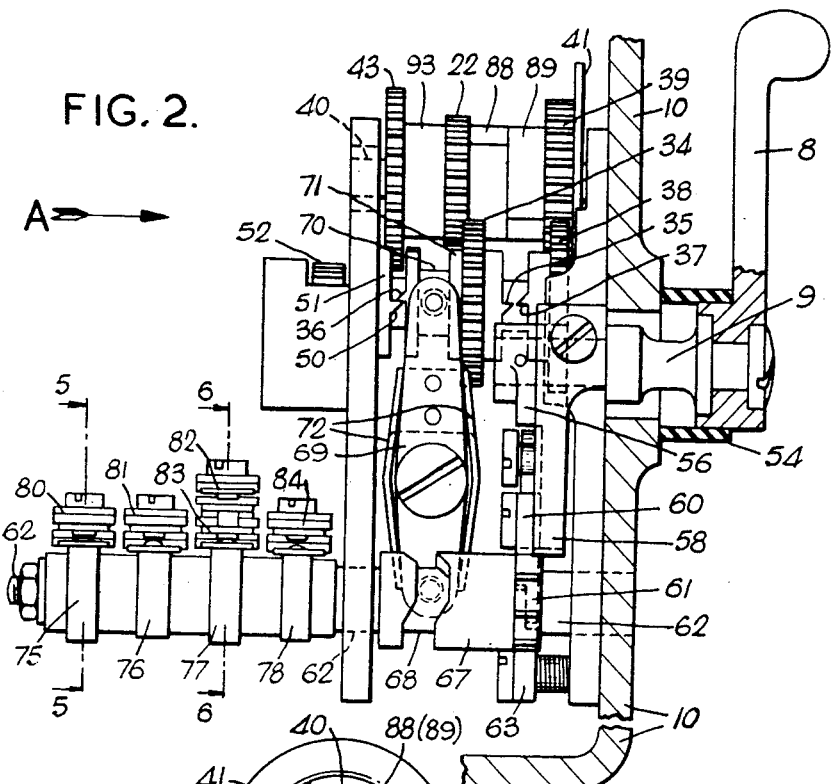
Figure 2 is a sectional view of the line 2—2 on Figure 1, omitting parts of the casing.

The clutch teeth 36 can engage clutch teeth 50, (Figure 2) on a rotary block 51 that carries a pinion 52 in mesh with the gearwheel 53 (although in the exploded view of Figure 4 shown spaced therefrom) which drives the spindle 45 and pinion 22.

In order to control the clutch and various other parts of the sextant, there is provided a finger lever 6 outside the casing 10 carried by a rocking shaft 9 that passes freely through an opening in the casing, the opening being covered by a rubber ring 54. Inside the casing the shaft 9 carries an arm 56 that is normally held against a stop 57 by a spring 58. The arm 56 carries a pivoted pawl 60 that engages a ratchet wheel 61 that has eight teeth, this ratchet wheel being mounted on a shaft 62. A pawl 63 prevents backward movements of the ratchet wheel and shaft 62. By these means, successive movements of the finger lever 8 rotate the shaft 62 one eighth of a revolution.

The shaft 62 carries a cam block 67 having a cam groove 68 in which a pin carried by a clutch or striking lever 69 is engaged, this clutch lever having a pin engaged in a groove 70 in a block 71 integral with the pinion 34 and clutch teeth 35, 36. The clutch lever is made in two parts pivoted together and held normally centralized by springs 72 which give if the clutch teeth clash when engaging.

The cam 68 is shaped so as to effect the following movements of the lever 69 for each eight consecutive conditions of the lever 8, viz. forward drive position; no change, reverse drive position; no change, forward drive position; no change, reverse drive position; no change.

Figure 7:
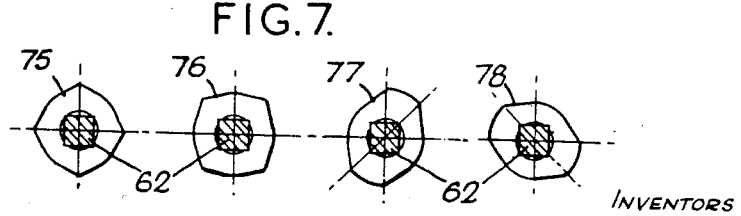
Figure 7 is a view showing the relative positions of certain cams.

The shaft 62 also carries four cams 75, 76, 77, and 78 of insulating material having the shapes and relative dispositions shown in Figure 7 in the second operative positions (e. g. cam 75 is "on").

The cam 75 operates a pair of spring blades 80 adapted to separate in order to provide a break in an electric current, controlling the motor 28 and provides the following eight consecutive conditions, viz: off, on, off, on, off, on, off, on.

Cam 76 operates a pair of blades 81 to give the conditions on off, on, off, on, off, on. off. this being the dial lighting switch.

Cam 77 controls two pairs of blades 82, 83 (which both open simultaneously and close simultaneously), for operating the integrator motor 28 and lighting of the optical parts of the sextant, giving the conditions on, on, off, off, on, on, off, off. Two of these blades (one of each pair) are connected together as shown by the double arrow in Figure 8.

Cam 78 controls a pair of blades 84 for reversing drive from the motor 28 and has the conditions off off, on, on, off, off, on, on.

The above mentioned conditions are quoted with the same starting point, i. e., all the first mentioned conditions occur simultaneously.

In order to limit the stroke of the rack 19 in both directions two further cams 88, 89, are provided, these being mounted on the shaft 40 and controlling two pairs of switch blades 90, 91. Blades 91 switch off the motor and the bubble light at the end of the measuring run. Also a cam 93 on the shaft 40 controls the dial lighting through switch arms 94. Blades 90 stop the motor 28 and switch the dial light off when the various parts have been returned to the zero position but remain closed throughout the remainder of the measuring run.

Figure 8:
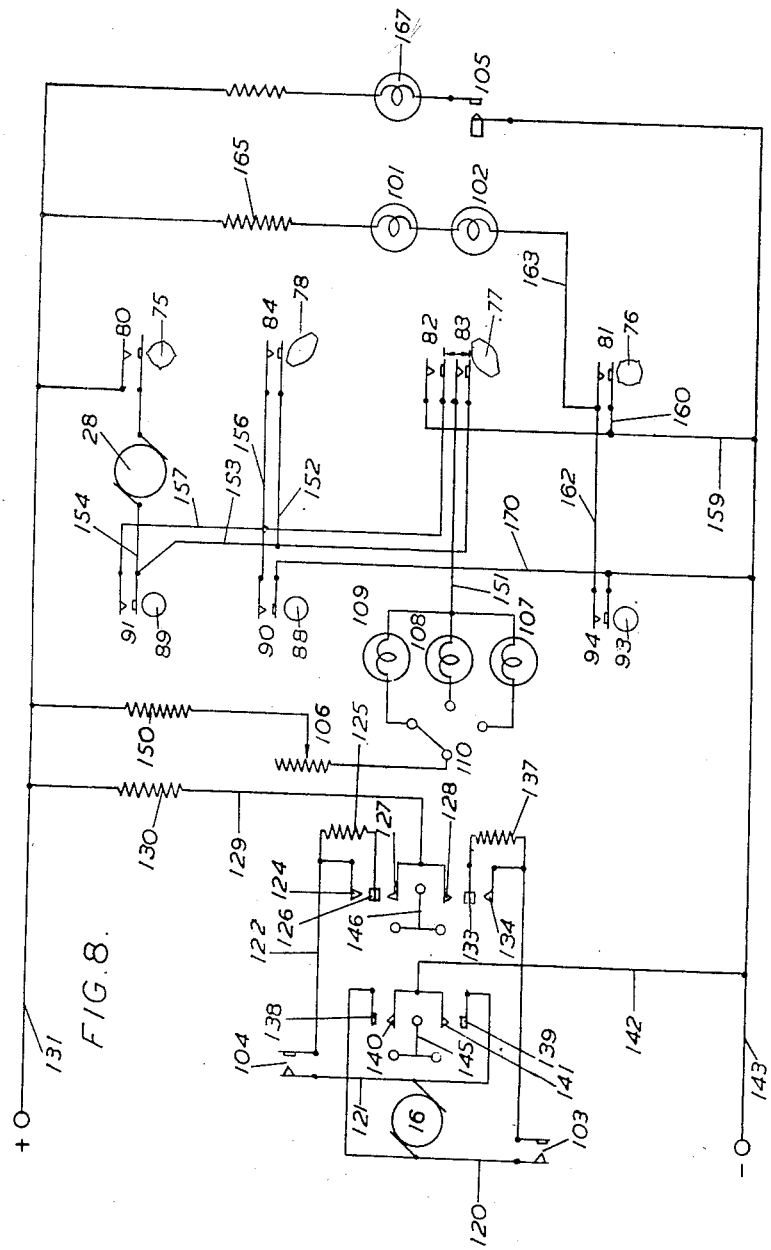
Figure 8 is an electrical diagram of the sextant.

Figure 8 shows an electric circuit diagram in which the altitude motor 16 which drives the screw 15 has one terminal connected to a lead 120 and the other connected to a lead 121. The lead 121 is connected to one contact of a limit switch 104 operated by the nut 9 reaching one end of worm 15; the other contact is connected by a lead 122 to a switch contact 124 and through a resistance 125 to a switch contact 126. A pair of switch contacts 127, 128 are connected by a common lead 129 through a resistance 130 to a positive line 131. A pair of contacts 133, 134 are connected to the limit switch 103 operated by the nut 9 reaching the other end of worm 15, the connection of the contact 133 including a resistance 137.

A pair of switch contacts 138, 139 are connected across the motor 16 and a pair of adjacent contacts 140, 141 are connected by a common lead 142 to a negative line 143.

A hand operable lever 145 is connected to a hand operable lever 146 so that these levers move in unison. When they are moved in one direction (up in the figure) contacts 126, 127 connect and also 138, 140 to drive the motor 16 in one direction and further movement in the same direction connects 124, 126, 127, thereby cutting the resistance 125 out of the motor circuit to give faster drive. Movement of 145, 146 in the down direction drives the motor with two selectable speeds in the opposite direction.

The sextant includes the following illuminating devices:

1. Bubble ring light 107. This is a known type of sighting illumination which produces a ring of light reflected from the bubble.

2. Bubble daylight light 109. This form of illumination is used for sighting of the sun and produces a black disc in an illuminated field. The bubble is illuminated. In observations the sun is made to coincide with the centre of the bubble and the size of the bubble is adjusted so that its apparent diameter is larger than that of the sun. A black ring is then visible round the sun and this black ring is on the edge of the black disc produced by the bubble daylight light.

3. Bubble spot light 108. This type of lighting is used only for night sighting and is also known as "red-spot lighting." The background is dark and the presence of the bubble is shown only by the presence of two red spots in a horizontal line. The star is placed between these for coincidence. The two spots are obtained by forming two images of a single lamp by means of two mirrors. The direct beam does not reach the collimating lens but since the bubble acts as a negative lens, light is refracted by the bubble into the lens and a minute image of the lamp is seen in the bubble.

4. Azimuth ring light 167. This consists of a small lamp illuminating the azimuth scale above it through a hole in the casing 10.

5. Dial lights 101, 102. This consists of a lamp which illuminates the altitude scales.

A bubble ring light 107, bubble spot-light 108, and bubble daylight light 109 are selectively coupled by switch 110 through an adjustable resistance 106 (for dimming) and a resistance 150 to the positive line 131. These lights are connected by a common lead 151 to one of a pair of contacts 83 the other of which is connected by lead 152 to one of the contacts 84, by a lead 153 to one of the contacts 91, and by a lead 154 to one terminal of the integrator motor 28. The other terminal of the motor 28 is connected to one of the contacts 80 the other of which is connected to the line 131. One of the contacts 82 is connected by lead 156 to the other contact 84 and by a lead 157 to the other contact 91. The other contact 82 is connected to the negative line 143 by lead 159 and by lead 160 to one of the contacts 81. The other contact 81 is connected by lead 162 to one of the contacts 94 and by lead 163 to dial lights 101, 102 which are in series and are connected through a resistance 165 to the positive line 131. An azimuth ring light 167 is connected across the positive and negative lines by hand switch 105.

The other contact 94 is connected by line 170 to the negative line and to one of the contacts 90 the other of which is connected to one of the contacts 84.

Four successive movements of the control lever 8 are arranged to take the ratchet shaft through 180° whereupon the instrument is in normal position ready for a further succession of four movements. The four movements operate as follows:

1. The illuminating circuits are completed for illuminating the bubble and other parts of the instrument. The switch 90 being open and switch 91 being in the closed condition, the cam 75 leaves switch 80 "off." The motor 28 is therefore not operated. Cam 76 connects blades 81 to illuminate dial lights 101, 102. Cam 77 closes switches 82, 83 as a cocking action. Cam 67, 68 is positioned for forward drive of the rack.

2. Cam 75 closes switch 80 to complete the circuit of motor 28 through switches 91, 82. Cam 76 switches off dial lighting during the forward run. The bubble lighting remains on. The motor 28 is automatically switched off by cam 89 opening switch 91 at the end position of the movement of the ball cage and the bubble illumination switched off, unless these actions are otherwise effected by a third movement of the control lever before this position is reached. The dial light also comes on again by cam 93 closing switch 94 at the end position of movement, again provided the third lever movement does not occur first and effect this result.

3. This lever movement stops the motor 28 by cam 75 opening switch 80 and cam 77 opening switches 82, 83 unless already stopped by cam 89 opening switch 91 in which case this lever movement only moves the switch 80 to its off position ready for its next movement. The dial light comes on or remains on, other lights go off or remain off. Cam 88 closes switch 90. Cam 78 also closes switch 84 in readiness for reversing drive of the motor 28.

4. Cam 75 closes switch 80 and completes circuit of the motor 28 through switches 84, 90. The striking lever 69 changes gear and the drive from the integrator motor is driven in reverse to return the ball cage or rack 19 at a higher speed to starting position and is there again automatically switched off by means of cam 88 opening the switch 90. The dial light is extinguished by cam 76 opening switch 81 so that all lights are now off.

We claim:

1. An angle measuring instrument having a casing, optical sighting means in the casing, sight angle varying means in the casing, a first motor in the casing for actuating the angle varying means in the forward and reverse directions, dial indicating elements, integrating means, a second motor for driving the integrating means, said integrating means comprising a variable input means connected to said angle varying means and an output connected to feed a resultant movement to at least one of said elements, first limit switch means operated by said angle varying means for switching off the first motor at opposite limits of movement of the angle varying means, second limit switch means for switching off the second motor at opposite limits of drive of the integrating means, cams driven by the second motor for operating said second limit switch means, lighting means in the casing, a plurality of control switches in the casing for controlling the lighting means and the second motor, a reversing gear through which the second motor drives the integrating means, a reversing element for reversing said gear, a rotary cam in the casing for actuating said reversing element, a rocking shaft carrying said cam and extending to a position outside the casing, a control lever outside the casing and connected to said rocking shaft, the lever being manually movable in one direction, spring means for effecting return movement of the lever in the opposite direction, a plurality of cams on said shaft positioned for operating said control switches, whereby a succession of movements of the shaft effects a required sequence of operations of the said switches including actuating the switches for switching the second motor off and on and switching the lighting means off and on and moving the reversing gear from forward drive to reverse drive and from reverse drive to forward drive.

2. An instrument as claimed in claim 1 wherein the reversing gear includes quicker reverse drive means than the forward drive.

3. An instrument as claimed in claim 1 wherein the lighting means include first lighting means for dial illuminating and second lighting means for lighting the sighting means, one of said control switches being in the circuit of the first lighting means, another of said control switches being in the circuit of the second lighting means, and further includes a dial lighting switch in the circuit of the first lighting means, and a cam driven by the second motor operating said dial lighting switch.

4. In an angle measuring instrument having result indicating means, electric lighting means and an electric motor for operating the indicating means, the provision of a plurality of control switches including at least one in the motor circuit and at least one in the lighting means circuit, a reversing gear through which the motor drives the indicating means, a reversing element for reversing said gear, a rotary cam in the casing for actuating said reversing element, a rocking shaft carrying said cam and extending to a position outside the casing, a control lever outside the casing, a ratchet gear operated by said lever and connected to said rocking shaft to drive it step by step, and a plurality of cams on said shaft positioned for operating said control switches, whereby a succession of movements of the shaft effects a required sequence of operations of said switches and actuation of the reversing gear.

PHILIP FRANCIS EVERITT.
JOHN KEEBLE.

References Cited in the file of this patent
UNITED STATES PATENTS

| Number | Name | Date |
|---|---|---|
| 1,386,032 | Simmon | Aug. 2, 1921 |
| 1,606,785 | Hodgkins | Nov. 16, 1926 |
| 1,766,656 | Kuntze et al. | June 24, 1930 |
| 2,145,938 | Mansfield et al. | Feb. 7, 1939 |
| 2,276,674 | Schroeder | Mar. 17, 1942 |
| 2,304,770 | Nichols | Dec. 8, 1942 |
| 2,399,530 | York et al. | Apr. 30, 1946 |
| 2,456,392 | Doyle | Dec. 14, 1948 |
| 2,516,187 | Deimel et al. | July 25, 1950 |

FOREIGN PATENTS

| Number | Country | Date |
|---|---|---|
| 525,801 | Great Britain | Sept. 4, 1940 |
| 581,722 | Great Britain | Oct. 23, 1946 |
| 946,903 | France | Dec. 27, 1948 |